(12) United States Patent
Tanigawa et al.

(10) Patent No.: US 9,090,429 B2
(45) Date of Patent: Jul. 28, 2015

(54) FILAMENT WINDING APPARATUS

(75) Inventors: Motohiro Tanigawa, Kyoto (JP);
Tadashi Uozumi, Kyoto (JP); Daigoro Nakamura, Kyoto (JP); Ken Hatta, Toyota (JP)

(73) Assignees: MURATA MACHINERY, LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 13/876,149

(22) PCT Filed: Sep. 21, 2011

(86) PCT No.: PCT/JP2011/071531
§ 371 (c)(1),
(2), (4) Date: Mar. 26, 2013

(87) PCT Pub. No.: WO2012/043342
PCT Pub. Date: Apr. 5, 2012

(65) Prior Publication Data
US 2013/0306783 A1     Nov. 21, 2013

(30) Foreign Application Priority Data

Sep. 28, 2010   (JP) .................................. 2010-217332

(51) Int. Cl.
| | |
|---|---|
| B21C 47/14 | (2006.01) |
| H01F 41/06 | (2006.01) |
| B65H 57/00 | (2006.01) |
| B29C 53/80 | (2006.01) |

(Continued)

(52) U.S. Cl.
CPC ............ *B65H 57/00* (2013.01); *B29C 53/8016* (2013.01); *B29C 70/32* (2013.01); *B29C 53/602* (2013.01)

(58) Field of Classification Search
USPC ........ 242/437, 438, 439.1, 439.2, 439.5, 444, 242/444.4
See application file for complete search history.

(56) References Cited

U.S. PATENT DOCUMENTS

| | | | | |
|---|---|---|---|---|
| 3,213,894 A | * | 10/1965 | Etchison, Jr. et al. | ...... 242/439.1 |
| 3,245,624 A | * | 4/1966 | Meyers et al. | ................ 242/444 |
| 4,010,054 A | * | 3/1977 | Bradt | ............................ 156/173 |

(Continued)

FOREIGN PATENT DOCUMENTS

| | | |
|---|---|---|
| JP | 05-254027 | 10/1993 |
| JP | 05254027 A | 10/1993 |

(Continued)

OTHER PUBLICATIONS

English language translation of international preliminary report on patentability dated Apr. 16, 2013 issued in corresponding PCT application PCT/JP2011/071531.

(Continued)

*Primary Examiner* — Emmanuel M Marcelo
(74) *Attorney, Agent, or Firm* — DLA Piper LLP (US)

(57) ABSTRACT

A filament winding apparatus in which a fiber bundle easily passes through a fiber supplying guide. The filament winding apparatus winds a fiber bundle around a liner, and includes a plurality of fiber supplying guides each supplying a fiber bundle to the liner. Each of the fiber supplying guides includes a bottom portion that guides a wide surface of the fiber bundle, side portions respectively disposed along both sides of the bottom portion, and an opening portion formed between the side portions.

3 Claims, 9 Drawing Sheets

(51) Int. Cl.
    *B29C 70/32*     (2006.01)
    *B29C 53/60*     (2006.01)

(56) References Cited

U.S. PATENT DOCUMENTS

| | | | | |
|---|---|---|---|---|
| 4,028,164 | A * | 6/1977 | Montagut | 156/173 |
| 5,897,729 | A * | 4/1999 | Bikson et al. | 156/172 |
| 6,431,490 | B1 * | 8/2002 | Monget et al. | 242/444 |
| 6,540,171 | B2 * | 4/2003 | Yasui et al. | 242/437 |
| 6,601,793 | B2 * | 8/2003 | Yasui et al. | 242/472.8 |
| 7,300,014 | B2 * | 11/2007 | Allen | 242/439.5 |
| 7,815,141 | B2 * | 10/2010 | Uozumi et al. | 242/445.1 |
| 8,105,454 | B2 * | 1/2012 | Uozumi et al. | 156/175 |
| 2006/0175454 | A1 * | 8/2006 | Allen | 242/439.5 |
| 2009/0038759 | A1 | 2/2009 | Uozumi et al. | |
| 2009/0065630 | A1 | 3/2009 | Moore, III | |
| 2009/0127373 | A1 | 5/2009 | Uozumi et al. | 242/436 |
| 2010/0032510 | A1 | 2/2010 | Tanigawa et al. | 242/430 |

FOREIGN PATENT DOCUMENTS

| | | |
|---|---|---|
| JP | 2007-190697 A | 8/2007 |
| JP | 2008296411 A | 12/2008 |
| JP | 2009-119732 | 6/2009 |
| JP | 2010-005831 | 1/2010 |
| JP | 2010005831 A | 1/2010 |
| JP | 2010-036461 | 2/2010 |
| WO | 99/65810 A1 | 12/1999 |

OTHER PUBLICATIONS

Extended European Search Report issued in corresponding application EP 11828899.2, dated Mar. 30, 2015.

* cited by examiner (A)

(B)

(A)

(B)

US 9,090,429 B2

FILAMENT WINDING APPARATUS

CROSS REFERENCE TO RELATED APPLICATIONS

This application is a national stage of international application PCT/JP2011/071531, filed on Sep. 21, 2011, and claims the benefit of priority under 35 USC 119 of Japanese application 2010-217332, filed on Sep. 28, 2010, which are incorporated herein by reference.

TECHNICAL FIELD

The present invention relates to a filament winding apparatus.

BACKGROUND ART

A filament winding apparatus has been known that includes a hoop winding device and a helical winding device and is configured to wind fiber bundles around a liner by performing hoop winding and helical winding alternately and repeatedly on the liner, thereby forming a reinforcement layer.

In the helical winding, the position of the helical winding device is fixed, and fiber bundles are wound around the liner by moving the liner in the direction of a rotation axis while the liner is rotated. The fiber bundles are supplied to the liner from fiber supplying guides disposed in the helical winding device. A filament winding apparatus has been also known that includes a first guide unit and a second guide unit, each of which includes a plurality of fiber supplying guides disposed radially in the helical winding device, and thus can simultaneously wind a plurality of fiber bundles (for example, Patent Document 1).

RELATED ART DOCUMENT

Patent Document

Patent document 1: Japanese Unexamined Patent Application Publication No. 2010-36461.

DISCLOSURE OF THE INVENTION

Problems to be Solved by the Invention

As described in Paragraph 0034 of Patent Document 1, the fiber supplying guide of the helical winding device of Patent Document 1 has a tapered shape that tapers from a base end portion toward a distal end portion. A flat guide hole penetrates the inside of the fiber supplying guide from the base end portion to the distal end portion so as to allow a fiber bundle to pass through. As preparation before actuating a helical winding device, a fiber bundle needs to be made to pass through each of the fiber supplying guides manually, and the leading end of each fiber bundle needs to be secured to the outer peripheral surface of the liner.

However, the operation to make each of the fiber bundles, one by one, pass through a thin, long, and flat guide hole is not easy and is a troublesome work. Further, the number of the fiber supplying guides of a helical winding device is large (for example, 180). Accordingly, it takes a long time to make fiber bundles pass through all the fiber supplying guides of the helical winding device.

Further, processing, such as providing a fiber supplying guide with a tapered shape that tapers from a base end portion toward a distal end portion and forming a flat guide hole penetrating from a base end portion toward a distal end portion inside the fiber supplying guide, is troublesome. Accordingly, the manufacturing cost of such a fiber supplying guide is high, and thus the manufacturing cost of the filament winding apparatus is high.

SUMMARY OF THE INVENTION

The present invention is made to solve the above-mentioned problem. The first object of the present invention is to provide a filament winding apparatus in which a fiber bundle can be easily made to pass through a fiber supplying guide. The second object of the present invention is to develop a fiber supplying guide that is manufactured easily at low cost, thereby providing a filament winding apparatus at a low price.

Means of Solving the Problems

The problems to be solved by the present invention are described above, and next, means for solving the problems will be described.

Specifically, a first invention is a filament winding apparatus configured to wind a fiber bundle around a liner, comprising a plurality of fiber supplying guides each being configured to supply a fiber bundle to the liner. Each of the fiber supplying guides includes a bottom portion that guides a wide surface of the fiber bundle, side portions respectively disposed along both sides of the bottom portion, and an opening portion formed between the side portions.

A second invention is the filament winding apparatus of the first invention that may further include a driving unit configured to make the fiber supplying guides rotate about an axis, and a controller configured to change an orientation of each of the fiber supplying guides by controlling the driving unit. The controller may change an orientation of the fiber supplying guide in accordance with a winding angle and winding direction in which the fiber bundle is wound around the liner, in such a manner that the fiber bundle does not fall off the fiber supplying guide.

The third invention is the filament winding apparatus of the first or the second invention in which an anti-falling member that partially covers the opening portion may be disposed detachably.

Effects of the Invention

As the effect of the present invention, the following effects are accomplished.

According to the first invention, the fiber supplying guides each includes the bottom portion that guides the wide surface of the fiber bundle, the side portions respectively disposed along both sides of the bottom portion, and the opening portion formed between the side portions. Accordingly, a fiber bundle needs not to pass through a guide hole that penetrates from a base end portion to a distal end portion, and thus a fiber bundle can be easily made to pass through the fiber supplying guide. Further, the fiber supplying guide of the present invention can be manufactured easier and at lower cost compared to the fiber supplying guide in which a guide hole penetrating from a base end portion to a distal end portion is formed.

According to the second invention, the orientation of the fiber supplying guide is changed in accordance with the winding angle and the winding direction in which the fiber bundle is wound around the liner, in such a manner that the fiber bundle does not fall off the fiber supplying guide. Accordingly, even if tension is applied on the fiber bundles, the fiber bundles do not fall off the fiber supplying guide. Therefore, the fiber bundles can be wound around the liner while sufficient tension is applied to the fiber bundles.

According to the third invention, the anti-falling member configured to partially cover the opening portion is disposed detachably. Accordingly, even while the winding is stopped and thus no tension is applied to the fiber bundles during the maintenance of the apparatus for example, the fiber bundles can be prevented from falling off the fiber supplying guide.

BEST MODE FOR CARRYING OUT THE INVENTION

Next, an embodiment of the invention will be described with reference to the drawings.

[Embodiment 1]

First, the entire configuration of a filament winding apparatus 100 according to Embodiment 1 of the present invention will be described with reference to FIG. 1. Hereafter, the filament winding apparatus 100 is described while being abbreviated to the FW apparatus 100.

Figure 1:
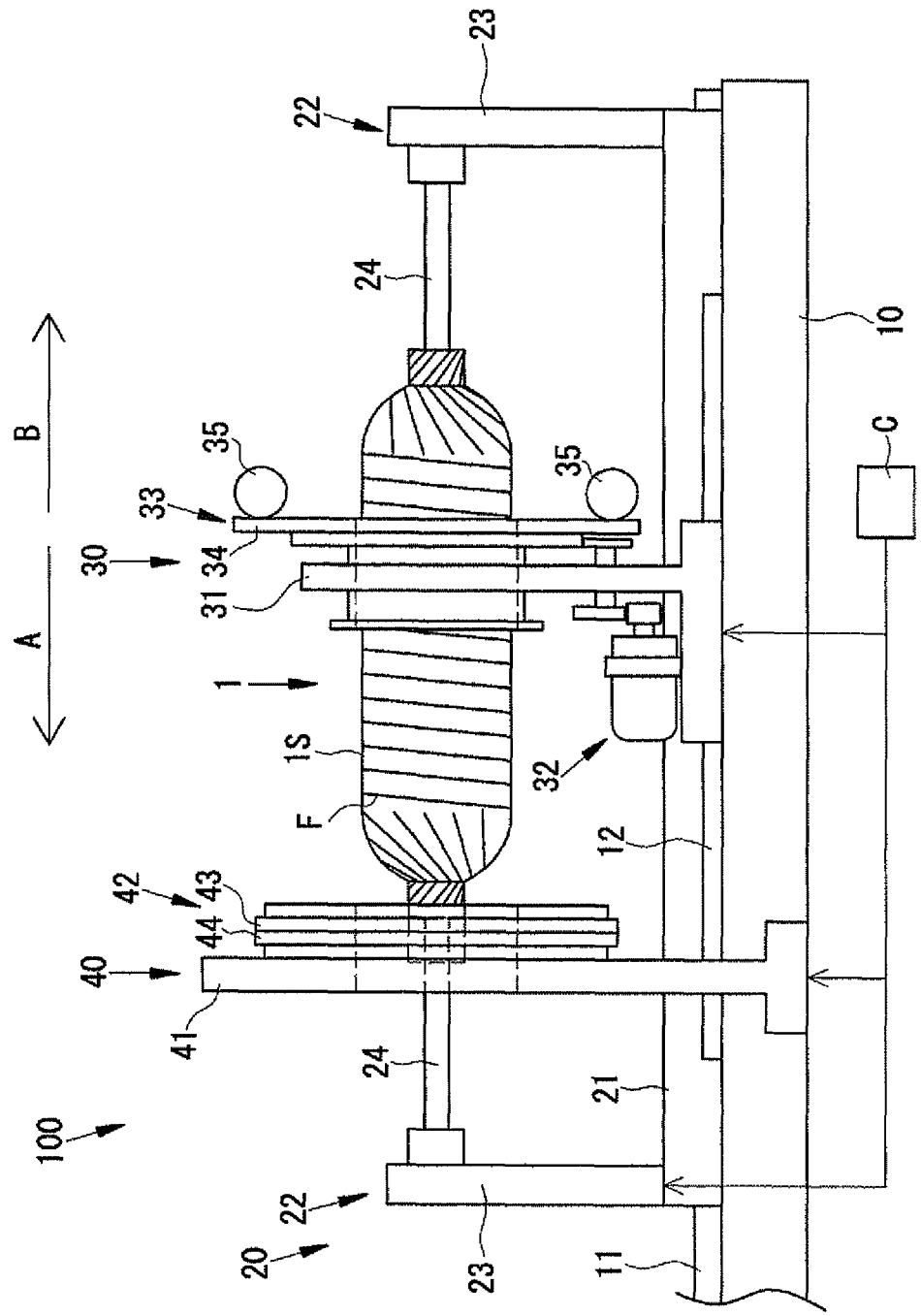
FIG. 1 is a schematic diagram illustrating an FW apparatus 100 according to an embodiment of the present invention.

FIG. 1 is a side view of the FW apparatus 100. The FW apparatus 100 is an apparatus that winds fiber bundles F around the periphery of a liner 1 by performing hoop winding and helical winding alternately and repeatedly on the liner 1.

Arrows A and B shown in FIG. 1 indicate the front-rear direction of the FW apparatus 100 and the conveyance direction of the liner 1 in the helical winding. In the helical winding, in order to make the liner 1 reciprocate in the front-rear direction of the FW apparatus 100, the liner 1 is conveyed in the direction indicated by the arrow A and conveyed in the direction indicated by the arrow B. In the following description, the front side in the direction to which the liner 1 is conveyed is defined as the front side of each of the liner 1 and the FW apparatus 100, and the other direction is defined as the rear side. That is, the front side and the rear side of the FW apparatus 100 are switched depending on the conveyance direction of the liner 1. When the liner 1 is conveyed in the direction indicated by the arrow A, the left side in FIG. 1 is defined as the front side of each of the liner 1 and the filament winding apparatus. Furthermore, when the conveyance direction of the liner 1 is switched, and thus the liner 1 is conveyed in the direction indicated by the arrow B, the right side in FIG. 1 is defined as the front side of each of the liner 1 and the FW apparatus 100.

The liner 1 is an approximately-tubular hollow container made of, for example, a high-strength aluminum material or a polyimide type resin. Through winding of fiber bundles F around an outer peripheral surface 1S of the liner 1, the pressure resistant property of the liner 1 can be improved. Thus, the liner 1 serves as a base member forming a pressure resistant container.

The FW apparatus 100 mainly includes a main base 10, a liner conveyance device 20, a hoop winding device 30, a helical winding device 40, and a controller C. The main base 10 forms the foundation of the FW apparatus 100. The main base 10 is provided with, on an upper portion thereof, the liner conveyance device rail 11. On the liner conveyance device rail 11, the liner conveyance device 20 is mounted. At the upper portion of the main base 10, the hoop winding device rail 12 is disposed in parallel to the liner conveyance device rail 11. On the hoop winding device rail 12, the hoop winding device 30 is mounted. With this configuration, the liner conveyance device 20 and the hoop winding device 30 are movable relative to the main base 10. The helical winding device 40 is secured to the main base 10.

The liner conveyance device 20 makes the liner 1 rotate about a rotation axis Ra (refer to FIG. 2) along the front-rear direction of the FW apparatus 100, and conveys the liner 1 in the front-rear direction of the FW apparatus 100. The liner conveyance device 20 mainly includes a base 21 and liner supporting sections 22. The actuation of the liner conveyance device 20 is controlled by the controller C.

The base 21 includes a pair of liner supporting sections 22. Each of the liner supporting sections 22 includes a liner supporting frame 23 and a supporting shaft 24. The liner supporting frame 23 extends upward from the base 21. The supporting shaft 24 extends from the liner supporting frame 23 along the front-rear direction of the FW apparatus. The supporting shaft 24 is rotated in one direction about its axis by a not-shown driving mechanism. The supporting shafts 24 respectively support both ends of the liner 1 so as to rotate the liner 1. With this configuration, the liner conveyance device 20 makes the liner 1 rotate via the supporting shafts 24 serving as a rotating shaft Ra, and conveys the liner 1 in the front-rear direction of the FW apparatus 100.

The hoop winding device 30 winds a fiber bundle F in hoop winding around the outer peripheral surface 1S of the liner 1. In the hoop winding, the fiber bundle F is wound around the peripheral surface 1S of the liner 1 with a winding angle of the fiber bundle F with respect to the central axis of the liner 1 being approximately 90°. The hoop winding device 30 mainly includes a base 31, a power mechanism 32, and a hoop winding support device 33. The actuation of the hoop winding device 30 is controlled by the controller C.

On the base 31, the power mechanism 32 and the hoop winding support device 33 are mounted. The hoop winding support device 33 includes a winding support table 34 and a bobbin 35. At the center of the winding support table 34, a space through which the liner 1 is inserted is provided. The bobbin 35 is disposed on the winding support table 34, and configured to supply a fiber bundle F to the outer peripheral surface 1S of a liner 1. The power mechanism 32 is configured to make the hoop winding support device 33 rotate about the central axis of the liner 1.

In the hoop winding, the position of the liner 1 is fixed, and the hoop winding support device 33 is rotated about the central axis of the liner 1 while the hoop winding device 30 moves along a direction of the central axis of the liner 1. Thus, the hoop winding is performed. It is to be noted that, by adjusting the moving speed of the hoop winding device 30 and the rotating speed of the winding support table 34, the winding form of the fiber bundles F can be changed freely.

The helical winding device 40 winds the fiber bundles F in helical winding around the outer peripheral surface 1S of the liner 1. In the helical winding, the fiber bundles F are wound around the outer peripheral surface 1S of the liner 1 so that the winding angle WA (refer to FIG. 2) of the fiber bundle F is a predetermined value (for example, 0 to 60 degrees). The helical winding device 40 mainly includes a base 41 and a helical winding support device 42. The actuation of the helical winding device 40 is controlled by the controller C.

On the base 41, the helical winding support device 42 is mounted. The helical winding support device 42 includes a first helical head 43 as a first guide unit and a second helical head 44 as a second guide unit. To the first helical head 43 and the second helical head 44, fiber bundles F are supplied from a plurality of bobbins (not-shown), and then the fiber bundles F are guided to the outer peripheral surface 1S of the liner 1 (refer to FIG. 2).

In the helical winding, the helical winding device 40 is fixed, and the liner 1 is conveyed in the direction of the central axis Ra while being rotated by the liner conveyance device 20. Thus, the helical winding is performed. It is to be noted that, by adjusting the conveying speed and rotating speed of the liner 1, the winding form of the fiber bundles F can be changed freely.

Figure 2:
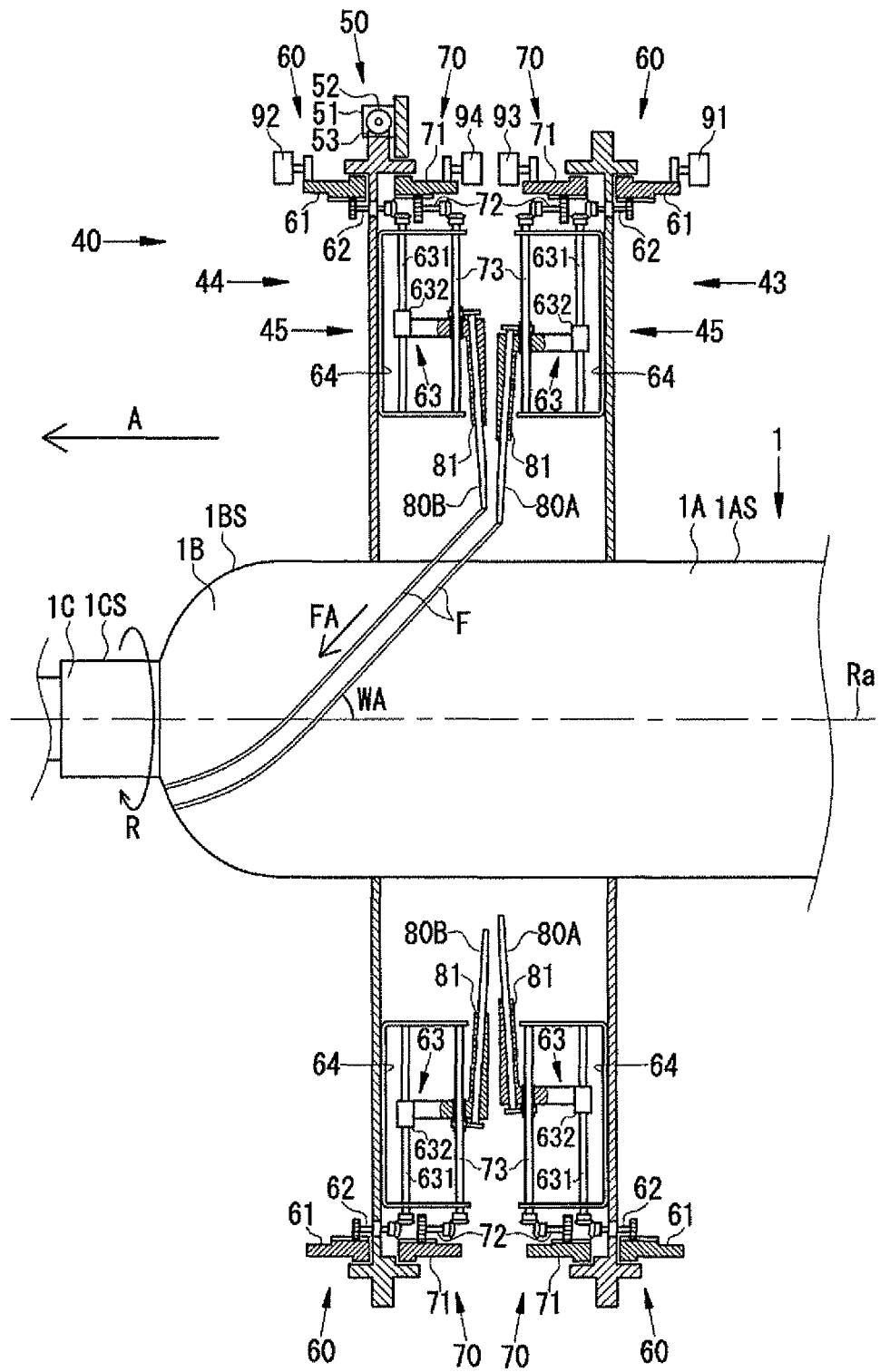
FIG. 2 is a schematic diagram illustrating a first helical head 43 and a second helical head 44 that configure a helical winding device 40.

Next, the first helical head 43 and the second helical head 44 that configure the helical winding device 40 are further described in detail. FIG. 2 is a side view showing the first helical head 43 and the second helical head 44. An arrow A shown in the drawing indicates the conveyance direction of the liner 1. Furthermore, an arrow R indicates the rotation direction of the liner 1.

As shown in FIG. 2, the first helical head 43 and the second helical head 44 are adjacently arranged in the conveyance direction of the liner 1. The first helical head 43 and the second helical head 44 include fiber supplying guides 80A and 80B configured to guide fiber bundles F to the outer peripheral surface 1S of the liner 1. The first helical head 43 includes a plurality of fiber supplying guides 80A that are arranged radially and are approximately perpendicular to the central axis Ra of the liner 1. The second helical head 44 includes a plurality of fiber supplying guides 80B that are arranged radially and are approximately perpendicular to the central axis Ra of the liner 1. Specifically, the fiber supplying guides 80A and 80B provided respectively to the first helical head 43 and the second helical head 44 are arranged in two rows in the conveyance direction of the liner 1.

The first helical head 43 and the second helical head 44 include a plurality of guide supporting devices 45. Each of the guide supporting devices 45 respectively supports the fiber supplying guide 80A and the fiber supplying guide 80B. Each of the guide supporting devices 45 respectively supports the fiber supplying guides 80A and 80B in such a manner that the fiber supplying guides 80A and 80B can extend and contract in a direction approximately perpendicular to the central axis Ra and that the fiber supplying guides 80A and 80B are rotatable around its axis. The first helical head 43 is configured in such a manner that all fiber supplying guides 80A can be extended or contracted at the same amount and rotated simultaneously, and the second helical head 44 is also configured in such a manner that all fiber supplying guides 80B can be extended or contracted at the same amount and rotated simultaneously. Further, the fiber supplying guides 80A of the first helical head 43 and the fiber supplying guides 80B of the second helical head 44 can be adjusted each other to extend, contract, and rotate by different amounts.

Here, the fiber supplying guides 80A and 80B of the present embodiment will be described with reference to FIG. 3 and FIGS. 4A and 4B. Since the fiber supplying guides 80A and 80B of the present embodiment have the same configuration, description is given for the fiber supplying guide 80A.

Figure 3:
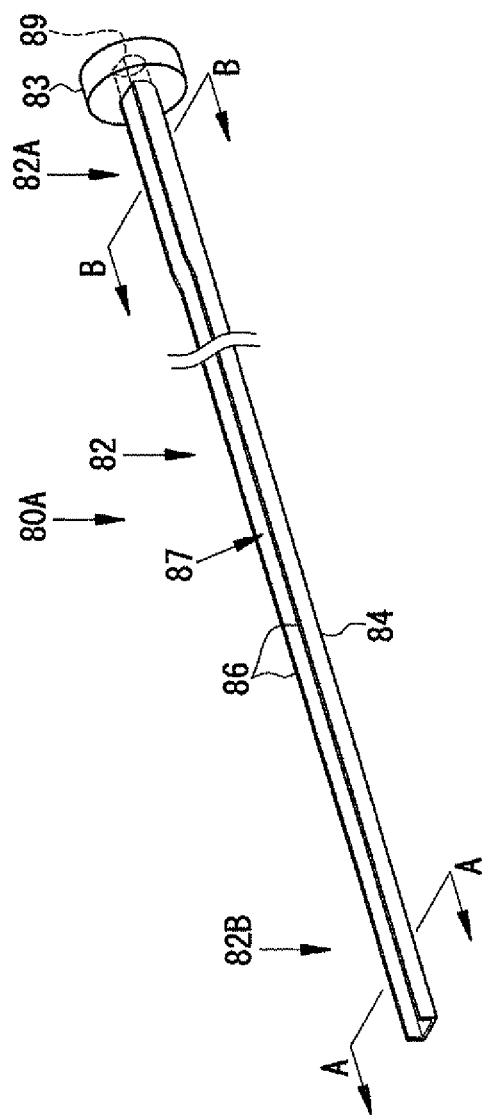
FIG. 3 is a perspective view of a fiber supplying guide 80A.

FIG. 3 is a perspective view of the fiber supplying guide 80A. FIGS. 4A and 4B are cross sectional views taken along a line A-A and a line B-B in FIG. 3. As shown in FIG. 3, the fiber supplying guide 80A mainly includes a fiber supplying guide main body 82 and a gear 83. The fiber supplying guide main body 82 guides a fiber bundle F supplied from the bobbin (not shown) from a base end portion 82A to a distal end portion 82B. The fiber supplying guide main body 82 includes a bottom portion 84 and side portions 86. As shown in FIG. 4A and FIG. 4B, the cross sectional shape of the fiber supplying guide 80A in the direction orthogonal to the axial direction is an approximately square U shape. The bottom portion 84 of the fiber supplying guide 80A has a flat surface on which the wide surface of the fiber bundle F is guided. The side portions 86 are disposed respectively on both sides of the bottom portion 84 and prevent the guided fiber bundle F from falling off. An opening portion 87 is formed between both the side portions 86.

Figure 4:
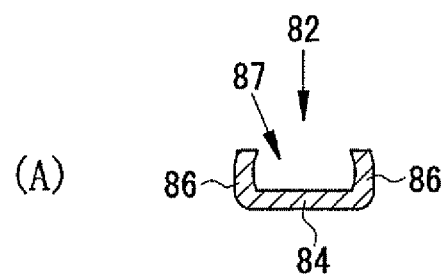
FIGS. 4A and 4B are cross sectional views taken along a line A-A and a line B-B in FIG. 3.
Figure 4:
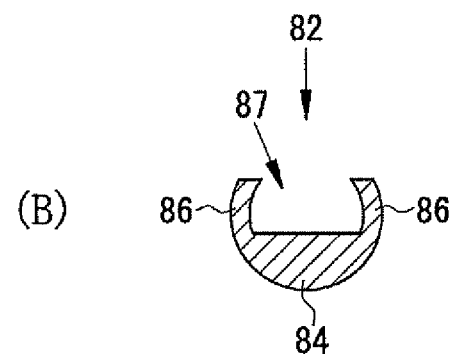

Further, as shown in FIG. 3 and FIG. 4B, especially at the base end portion 82A, the side portion 86 is high and is curved toward the inside. The lower part of the bottom portion 84 has a semicircular shape. Namely, as shown in FIG. 4B, the cross-sectional shape at the base end portion 82A is a shape of a partially omitted circle which is formed by the bottom portion 84 and the side portions 86. This base end portion 82A is axially supported rotatably by the guide supporting member 81 of the guide supporting device 45 mentioned later. Thus, the fiber supplying guide 80A is axially supported rotatably by the guide supporting member 81.

The gear 83 meshes with a driving gear 77 disposed on a rotation mechanism 70 of the guide supporting device 45 mentioned later and makes the fiber supplying guide 80A rotate about the axis. As shown in FIG. 3, an insertion hole 89 is formed at the central portion of the gear 83. By press fitting the base end portion 82A of the fiber supplying guide main body 82 into the insertion hole 89, the gear 83 is secured to the fiber supplying guide main body 82. Further, the fiber bundle F supplied from the bobbin (not-shown) is made to pass through the insertion hole 89, and the fiber bundle F is guided to the fiber supplying guide main body 82.

Thus, the fiber supplying guide main body 82 of the fiber supplying guide 80A is consisted of the bottom portion 84 and the side portions 86, and the opening portion 87 is provided. Accordingly, when passing through the fiber supplying guide 80A, a fiber bundle F may first pass through the insertion hole 89, and then, be fitted through the opening portion 87. Therefore, the fiber bundle F needs not to pass through a guide hole that penetrates from the base end portion to the distal end portion, and thus a fiber bundle F can be easily made to pass through the fiber supplying guide 80A.

Further, the fiber supplying guide 80A can be processed by a press-processing means and the like. Accordingly, manufacturing is easier and thus the cost is lower in comparison with the conventional fiber supplying guide in which a guide hole is formed from a base end portion to a distal end portion.

By providing the fiber supplying guides 80A and 80B with such a configuration to the first helical head 43 and the second helical head 44, each of the first helical head 43 and the second helical head 44 can guide a plurality of fiber bundles F simultaneously to the outer peripheral surface 1S of the liner 1. In the FW apparatus 100 according to this embodiment, the first helical head 43 includes 90 fiber supplying guides 80A, and the second helical head 44 includes 90 fiber supplying guides 80B. Therefore, it is possible to perform the helical winding by guiding a total of 180 fiber bundles F simultaneously to the outer peripheral surface 1S of the liner 1.

Moreover, the FW apparatus 100 according to this embodiment includes a driving unit 50 that drives the second helical head 44 in the circumferential direction of the liner 1 about the rotation axis Ra of the liner 1. The drive unit 50 includes a worm gear 52 rotated by an electric motor 51 and a rack gear 53 secured to the second helical head 44. The driving unit 50 drives the second helical head 44 with the rotation power of the electric motor 51. Thus, the driving unit 50 can drive the second helical head 44 and adjust the phase difference between the first helical head 43 and the second helical head 44.

Figure 5:
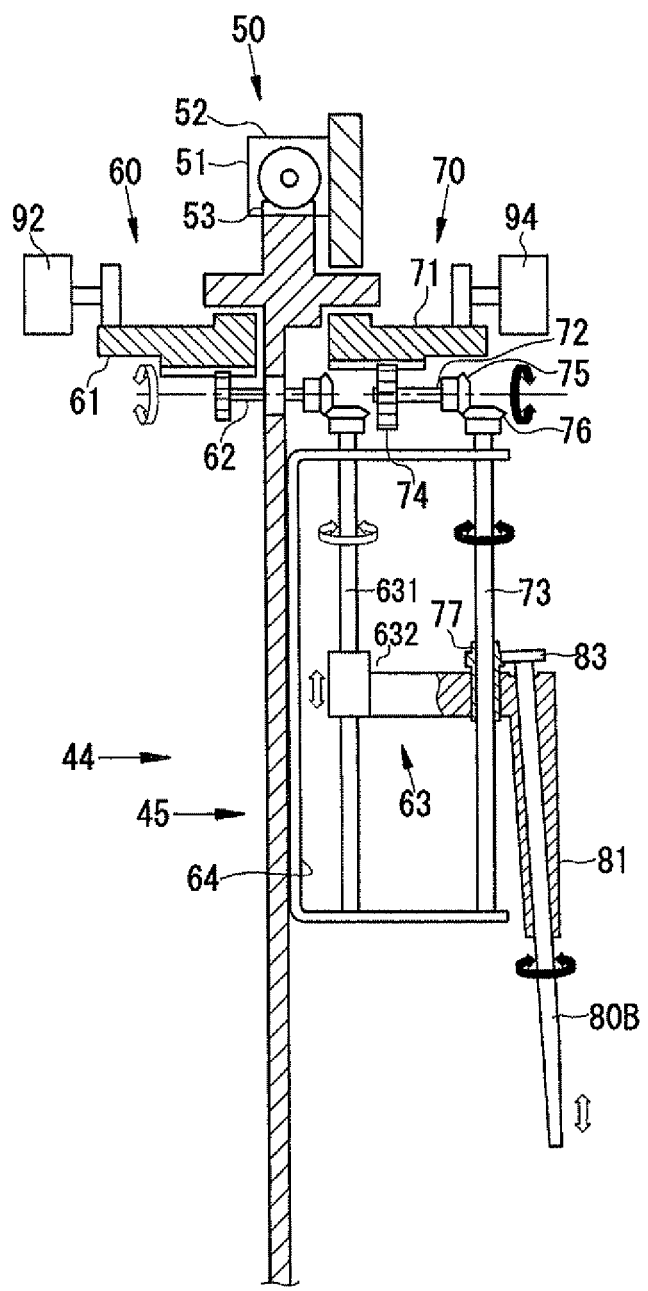
FIG. 5 is a schematic view of a guide supporting device 45 that configures the first helical head 43 and the second helical head 44.

Next, with reference to FIG. 5, description is given in detail to the guide supporting device 45 that supports the fiber supplying guide 80A of the first helical head 43 and the fiber supplying guide 80B of the second helical head 44. The guide supporting device 45 is common between the first helical head 43 and the second helical head 44, and FIG. 5 shows the guide supporting device 45 disposed on the second helical head 44.

As shown in FIG. 5, the guide supporting devices 45 are arranged radially to the first helical head 43 and the second helical head 44 in the number corresponding to the number of each of the fiber supplying guides 80A and 80B, and each of the guide supporting devices 45 includes a movement mechanism 60 and a rotation mechanism 70. Each of the fiber supplying guides 80A and 80B is axially supported rotatably by the guide supporting member 81. In the drawing, a white arrow indicates the operation direction of the members that construct the movement mechanism 60, and a black arrow indicates the operation direction of the members that construct the rotation mechanism 70.

The movement mechanism 60 changes an amount of extension or contraction of each of the fiber supplying guides 80A and 80B in the direction approximately perpendicular to the central axis Ra of the liner 1. The movement mechanism 60 mainly includes a rotation tube 61, an intermediate shaft 62, and a ball screw 63. The movement mechanism 60 of the first helical head 43 is driven by an electric motor 91 serving as a driving unit that changes an amount of extension or contraction of the fiber supplying guides 80A. The movement mechanism 60 of the second helical head 44 is driven by an electric motor 92 serving as a driving unit that changes an amount of extension or contraction of the fiber supplying guide 80B.

The rotation tube 61 is an annular member having an internal gear on its inner peripheral surface. The rotation tube 61 is coaxially arranged around the central axis Ra of the liner 1, and rotated by the electric motors 91 and 92.

The intermediate shaft 62 transmits the rotation of the rotation tube 61 to a spiral shaft 631 that forms the ball screw 63. A pinion gear disposed on the one end of the intermediate shaft 62 meshes with the internal gear of the rotation tube 61. Moreover, a bevel gear disposed on the other end of the intermediate shaft 62 meshes with the bevel gear of the spiral shaft 631.

The ball screw 63 converts the rotating motion of the intermediate shaft 62 into the movement motion of the guide supporting member 81. The ball screw 63 mainly includes a spiral shaft 631 and a ball nut 632.

The spiral shaft 631 is rotated by the intermediate shaft 62. On the outer peripheral surface of the spiral shaft 631, a groove having a cross-sectional shape of an arc is formed to define a spiral form. The spiral shaft 631 is supported rotatably by an annular member 64 having a cross-sectional shape of a letter "C".

The ball nut 632 is a tubular member that is fit externally around the spiral shaft 631. On the inner peripheral surface of the ball nut 632, a groove having a cross-sectional shape of an arc is formed to define a spiral form. Further, the ball nut 632 is inserted and secured in a through-hole provided to the guide supporting member 81. The groove cut in the inner periphery surface of the ball nut 632 is arranged to face the groove cut in the outer periphery surface of the spiral shaft 631, thereby forming a spiral space having a circular cross-sectional view.

In the spiral space mentioned above, a steel ball is provided. The steel ball is held between the groove formed in the spiral shaft 631 and the groove formed in the ball nut 632. Since a plurality of steel balls are provided in the spiral space, the ball nut 632 does not become rickety.

With this configuration, the movement mechanism 60 transmits the driving power of one of the electric motors 91 and 92 to the spiral shaft 631 via the rotation tube 61 and the intermediate shaft 62, and converts the rotating motion of the spiral shaft 631 into the shifting motion of the guide supporting member 81. Accordingly, the plurality of the fiber supplying guides 80A and 80B supported by the guide supporting member 81 can be extended and contracted in the direction approximately perpendicular to the central axis Ra of the liner 1.

Further, the fiber supplying guides 80A of the first helical head 43 and the fiber supplying guides 80B of the second helical head 44 can be extended and contracted with amount and timing of extension and contraction being different therebetween. The amount and timing of extension or contraction of the fiber supplying guides 80A of the first helical head 43 is controlled by the controller C controlling the rotation direction, the amount of rotation, and the rotation timing of the electric motor 91. The amount and the timing of extension and contraction of the fiber supplying guides 80B of the second helical head 44 is controlled by the controller C controlling the rotation direction, amount of rotation, and the rotation timing of the electric motor 92.

The rotation mechanism 70 makes the fiber supplying guides 80A and 80B rotate around the respective axes of the fiber supplying guides 80A and 80B. The rotation mechanism 70 mainly includes a rotation tube 71, an intermediate shaft 72, and a driving shaft 73. The rotation mechanism 70 of the first helical head 43 is driven by an electric motor 93 serving as a driving unit that changes an amount of rotation of the fiber supplying guides 80A. The rotation mechanism 70 of the second helical head 44 is driven by an electric motor 94 serving as a driving unit that changes an amount of rotation of the fiber supplying guides 80B.

The rotation tube 71 is an annular member having an internal gear formed on an inner peripheral surface thereof. The rotation tube 71 is coaxially arranged around the central axis Ra of the liner 1, and rotated by the electric motors 93 and 94.

The intermediate shaft 72 is a member that transmits the rotation of the rotation tube 71 to the driving shaft 73. A pinion gear disposed on the one end of the intermediate shaft 72 meshes with the internal gear of the rotation tube 71.

Moreover, a bevel gear 75 disposed on the other end of the intermediate shaft 72 meshes with a bevel gear 76 of the driving shaft 73.

The driving shaft 73 is a spline shaft that transmits the rotation of the intermediate shaft 72 to the fiber supplying guide 80A, 80B. As mentioned above, the bevel gear 76 disposed on the one end of the driving shaft 73 meshes with the bevel gear 75 of the intermediate shaft 72. Further, a driving gear that is fit externally around the driving shaft 73 meshes with the gear 83 of the fiber supplying guide 80A, 80B. The driving shaft 73 is supported rotatably by the annular member 64 having a cross-sectional shape of a letter "C".

With this configuration, the rotation mechanism 70 transmits the driving power of one of the electric motors 93 and 94 to the driving shaft 73 via the rotation tube 71 and the intermediate shaft 72, and the fiber supplying guides 80A and 80B can rotate about the respective axes of the fiber supplying guides 80A and 80B via the respective gears 83 of the fiber supplying guides 80A and 80B.

Further, the fiber supplying guides 80A of the first helical head 43 and the fiber supplying guides 80B of the second helical head 44 can be rotated with the direction, amount, and timing of rotation being different therebetween. The direction, the amount (orientation of the fiber supplying guide 80A), and the timing of rotation of the fiber supplying guides 80A of the first helical head 43 is controlled by the controller C controlling the direction, the amount, and the timing of rotation of the electric motor 93. The direction, the amount (orientation the fiber supplying guide 80B), and the timing of rotation of the fiber supplying guides 80B of the second helical head 44 is controlled by the controller C controlling the direction, the amount, and the timing of rotation of the electric motor 94.

Next, operations of the fiber supplying guides 80A and 80B in the helical winding of the FW apparatus 100 with the above configuration will be described. It is assumed that the liner 1 used in the present embodiment includes a first tubular portion 1A having a constant radius, dome portions 1B respectively disposed on both ends of the tubular portion 1A, and second tubular portions 1C respectively disposed on ends of the dome portions 1B. Further, it is assumed that the liner 1 is mounted on the liner conveyance device 20, and that winding conditions, such as the conveyance speed and rotation speed of the liner 1, the number of times to convey the liner 1 in a reciprocated manner, a conveyance distance, and the like are inputted to the controller C beforehand by an operator. The control unit C is configured to control the actuation of each of the electric motors 93 and 94 based on the inputted winding conditions, and to control changing the orientation of each of the fiber supplying guides 80A and 80B in the following way in response to the winding angle to wind the fiber bundle F around the liner 1 and the winding direction for preventing the fiber bundles F from falling off the fiber supplying guides 80A and 80B.

Figure 6:
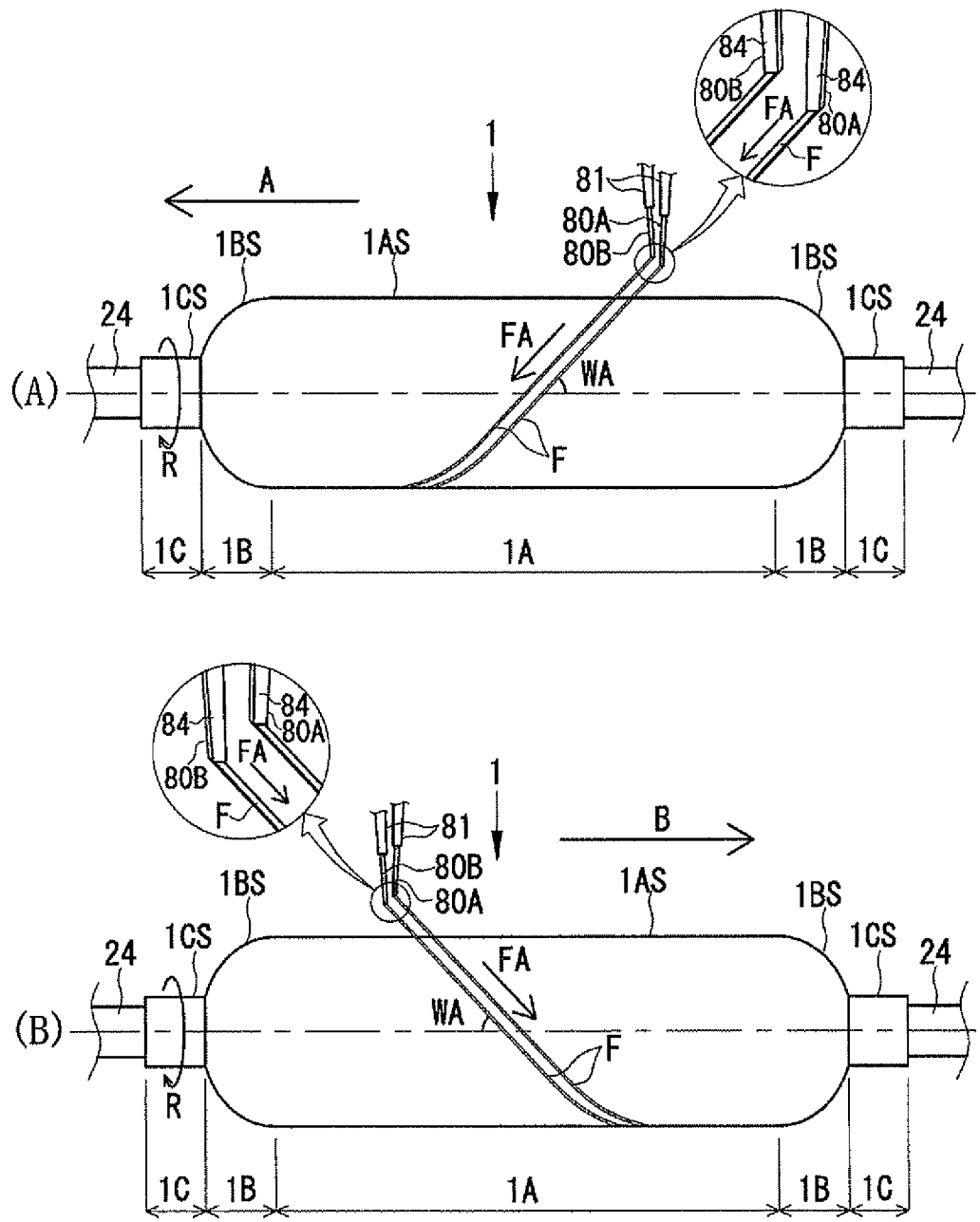
FIGS. 6A and 6B are side views showing the state where fiber bundles F are wound in helical winding around an outer peripheral surface 1AS of the first cylindrical portion 1A.
Figure 7:
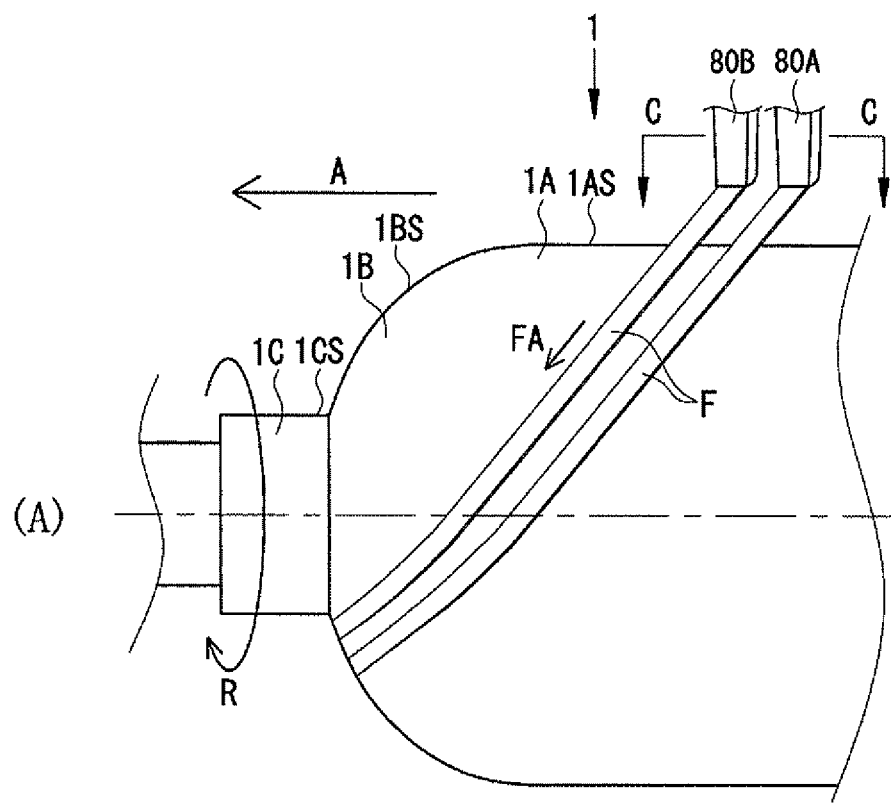
FIG. 7A is a side view showing the state where fiber bundles F are wound in helical winding around the outer peripheral surface 1AS of the first cylindrical portion 1A.
FIG. 7B is a cross-sectional view taken along a line C-C in FIG. 7A.
Figure 7:
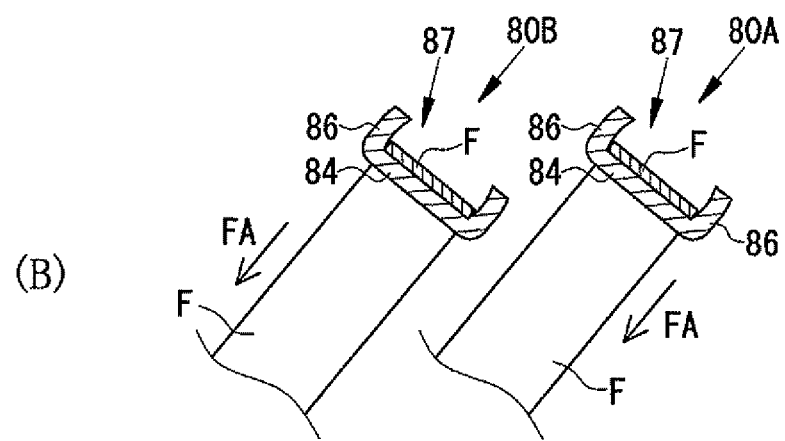

FIG. 6A and FIG. 6B are side views showing the state where fiber bundles F are wound in the helical winding around the outer peripheral surface 1AS of the first tubular portion 1A. FIG. 7A is a side view showing the state where fiber bundles F are wound in the helical winding around the outer peripheral surface 1AS of the first tubular portion 1A. FIG. 7B is a diagram illustrating the relationship between the orientation of the fiber supplying guides 80A and 80B and the orientation of the fiber bundle F in this state, and is a cross sectional view taken along a line C-C in FIG. 7A.

An arrow A shown in FIG. 6A indicates the conveyance direction of the liner 1, and an arrow B shown in FIG. 6B indicates that the liner 1 is conveyed in the direction opposite to the conveyance direction in FIG. 6A. An arrow R in FIG. 6A and FIG. 6B indicates the rotation direction of the liner 1. In the helical winding, the fiber bundles F are wound while the liner 1 is conveyed. Accordingly, the winding direction of the fiber bundle F (hereafter, merely referred to as "winding direction") relative to a direction of the central axis of the liner 1 is opposite to the conveyance direction of the liner 1. Therefore, in FIG. 6A, the winding direction of the fiber bundle F is the rightward direction in the drawing, opposite to the direction indicated by the arrow A, and in FIG. 6B, the winding direction of the fiber bundle F is the leftward direction in the drawing, opposite to the direction indicated by the arrow B.

The winding direction shown in FIG. 6A is the rightward direction, opposite to the direction indicated by the arrow A in the drawing. In this case, the control unit C controls the rotation direction and the amount of rotation of the fiber supplying guides 80A and 80B by controlling the actuation of the electric motors 93 and 94, thereby controlling the orientation of the fiber supplying guides 80A and 80B so as to prevent the fiber bundles F from falling off the fiber supplying guides 80A and 80B.

Specifically, in the case of the winding angle and the winding direction shown in FIG. 7A, as shown in FIG. 7B, the orientation of the opening portion 87 is made to be opposite to the direction FA in which the fiber bundle F is sent out. Further, in a cross sectional view in FIG. 7B, the bottom portion 84 is made approximately orthogonal to the direction FA in which the fiber bundle F is sent out.

On the other hand, the wind-up direction shown in FIG. 6B is the leftward direction opposite to the direction indicated by the arrow B in the drawing. In this case, the control unit C controls the rotation direction and the amount of rotation of the fiber supplying guides 80A and 80B by controlling the actuation of the electric motors 93 and 94, thereby controlling the orientation of the fiber supplying guides 80A and 80B so as to prevent the fiber bundles F from falling off the fiber supplying guides 80A and 80B.

Specifically, similarly to the case shown in FIG. 6A, the orientation of the opening portion 87 is made to be opposite to the direction FA in which the fiber bundle F is sent out. Further, in the cross sectional view of the fiber supplying guides 80A and 80B, the bottom portion 84 is made to be approximately orthogonal to the direction FA in which the fiber bundle F is sent out (refer to FIG. 7A and FIG. 7B).

Figure 8:
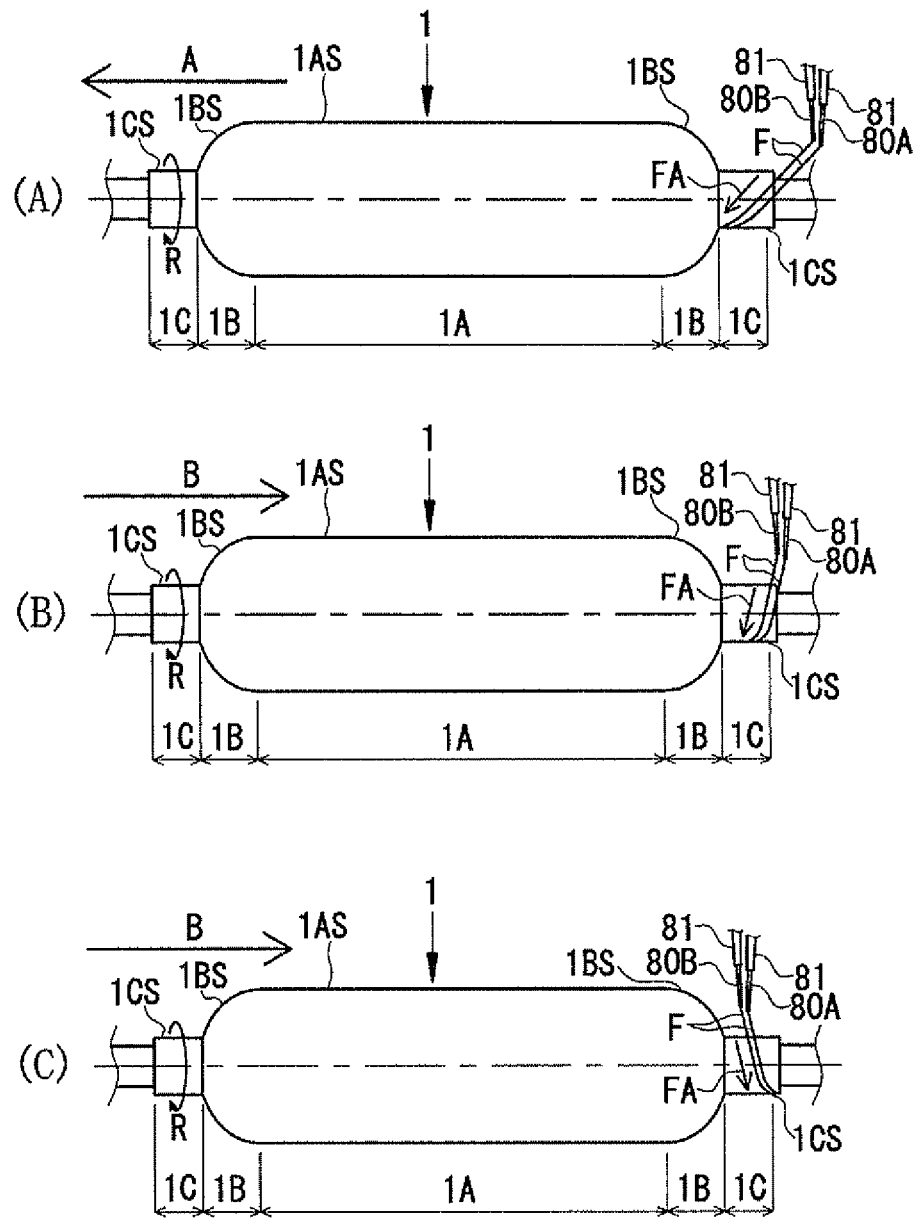
FIGS. 8A, 8B and 8C are side views showing the state where the winding direction of fiber bundles F is switched while the fiber bundles F is wound in helical winding around an outer peripheral surface 1CS of a second cylindrical portion 1C.

Next, FIG. 8A, FIG. 8B, and FIG. 8C are side views showing the state where the winding direction of the fiber bundles F is switched while winding the fiber bundles F around the outer peripheral surface 1CS of the second cylindrical portion 1C and a cross sectional view showing the relationship between the orientation of the fiber supplying guides 80A and 80B and the orientation of the fiber bundles F in the above state.

In FIG. 8A, the conveyance direction of the liner 1 is the direction indicated by the arrow A, and the winding direction of the fiber bundle F is the rightward direction, opposite to the direction indicated by the arrow A in the drawing. In FIG. 8B, the conveyance direction of the liner 1 has been switched from the direction in FIG. 8A to the direction indicated by the arrow B, and the winding direction of the fiber bundle F has been switched to the leftward direction, opposite to the direction indicated by the arrow B in the drawing. FIG. 8B shows the state immediately after the winding direction of the fiber bundle F has been switched. In FIG. 8C, as compared with FIG. 8B, the winding of the fiber bundles F progressed more. The winding position of the fiber bundles F being wound around the liner 1 is changed to be more on the rear side than the position of each of the fiber supplying guide 80A of the first helical head 43 and the fiber supplying guide 80B of the second helical head 44 in the winding direction of the fiber bundle F (the direction opposite to the indication indicated by the arrow B).

As shown in FIG. 8A, FIG. 8B, and FIG. 8C, in the case where the winding direction of the fiber bundle F is switched, the direction FA in which the fiber bundles F are sent out, changes gradually. Even in such a case, the control unit C controls the orientation of the fiber supplying guides 80A and 80B in response to the gradual change in such a way that the orientation of the opening portion 87 of each of the fiber supplying guides 80A and 80B is made to be opposite to the direction FA in which the fiber bundles F are sent out, and that the bottom portion 84 is made to be approximately orthogonal to the direction FA in which the fiber bundles F are sent out.

Thus, in accordance with the winding angle and the winding direction in which the fiber bundles F are wound around the liner 1, the control unit C controls the orientation of the fiber supplying guides 80A and 80B so as to prevent the fiber bundles F from falling off the fiber supplying guides 80A and 80B. Accordingly, even if tension is applied on the fiber bundles F, the fiber bundles F do not fall off the fiber supplying guides 80A and 80B. Consequently, the fiber bundles F can be wound around the liner 1 with sufficient tension applied to the fiber bundles F.

Figure 9:
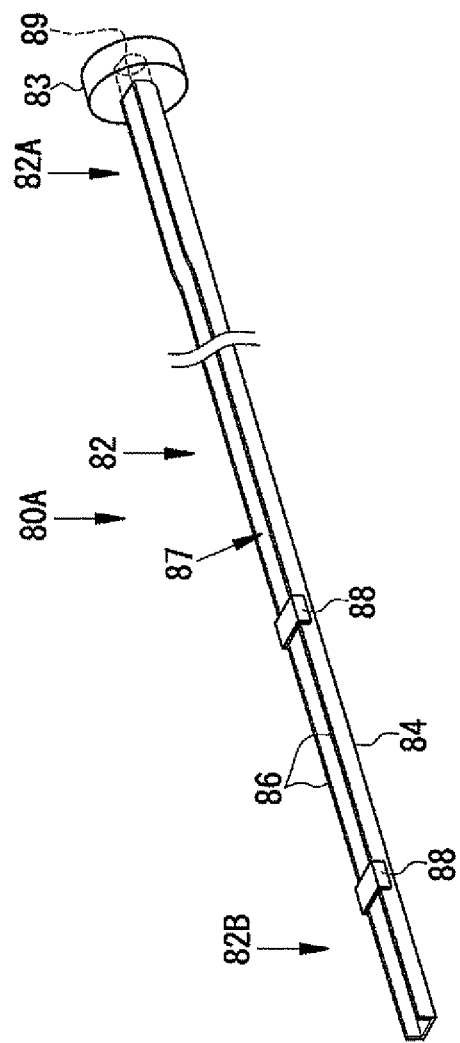
FIG. 9 is a perspective view showing another example of the fiber supplying guide 80A.

FIG. 9 is a perspective view showing another example of the fiber supplying guide 80A. The fiber supplying guide main body 82 is provided with an anti-falling member 88 partially covering the opening portion 87. With the anti-falling member 88, even while the winding is stopped and thus no tension is applied to the fiber bundles F during the maintenance of the FW apparatus 100 for example, the fiber bundles F can be prevented from falling off the fiber supplying guide 80A. The anti-falling member 88 is preferably disposed detachably. Further, as the anti-falling member 88, for example, a resin tube or a resin tape may be employed.

INDUSTRIAL APPLICABILITY

The filament winding apparatus of the present invention facilitates an operation to make a fiber bundle pass through a fiber supplying guide. Thus, the filament winding apparatus can be provided at low price. Accordingly, the filament winding apparatus of the present invention is industrially useful.

DESCRIPTION OF THE REFERENCE NUMERAL

1 Liner
1S Outer peripheral surface
10 Main base
20 Liner conveyance device
30 Hoop winding device
40 Helical winding device
42 Helical winding support device
43 First helical head
44 Second Helical head
45 Guide supporting device
50 Driving unit
51 Electric motor
52 Worm gear
53 Rack gear
60 Movement mechanism
61 Rotation tube
62 Intermediate shaft
62 Ball screw
70 Rotation mechanism
71 Rotation tube
72 Intermediate shaft
73 Driving shaft
80A, 80B Fiber supplying guide
81 Guide supporting member
82 Fiber supplying guide main body
83 Gear
84 Bottom portion
86 Side portion
87 Opening portion
88 Anti-falling member
89 Insertion hole
100 Filament winding apparatus
F Fiber bundle
WA Winding angle

The invention claimed is:

1. A filament winding apparatus configured to wind a fiber bundle around a liner, comprising a plurality of fiber supplying guides each being configured to supply a fiber bundle to the liner, wherein
   each of the fiber supplying guides includes a bottom portion that guides a wide surface of the fiber bundle, side portions respectively disposed along both sides of the bottom portion, and an opening portion formed between the side portions, and
   each of the fiber supplying guides has an approximately U-shaped cross section in a direction orthogonal to an axial direction.

2. The filament winding apparatus according to claim 1, further comprising:
   a driving unit configured to make the fiber supplying guides rotate about an axis; and
   a controller configured to change an orientation of each of the fiber supplying guides by controlling the driving unit,
   wherein the controller changes an orientation of the fiber supplying guide in accordance with a winding angle and winding direction in which the fiber bundle is wound around the liner, in such a manner that the fiber bundle does not fall off the fiber supplying guide.

3. The filament winding apparatus according to claim 1, wherein an anti-falling member configured to partially cover the opening portion is disposed detachably.

* * * * *